US012680599B2

(12) United States Patent
Meixner

(10) Patent No.: US 12,680,599 B2
(45) Date of Patent: Jul. 14, 2026

(54) DRIVE DEVICE FOR A MOTOR VEHICLE

(71) Applicant: AUDI Aktiengesellschaft, Ingolstadt (DE)

(72) Inventor: Christian Meixner, Ingolstadt (DE)

(73) Assignee: AUDI Aktiengesellschaft, Ingolstadt (DE)

( * ) Notice: Subject to any disclaimer, the term of this patent is extended or adjusted under 35 U.S.C. 154(b) by 0 days.

(21) Appl. No.: 19/148,549

(22) PCT Filed: Jan. 9, 2024

(86) PCT No.: PCT/EP2024/050394
§ 371 (c)(1),
(2) Date: Jul. 24, 2025

(87) PCT Pub. No.: WO2024/153497
PCT Pub. Date: Jul. 25, 2024

(65) Prior Publication Data
US 2026/0117850 A1      Apr. 30, 2026

(30) Foreign Application Priority Data

Jan. 16, 2023      (DE) ..................... 10 2023 200 288.4

(51) Int. Cl.
*B60K 17/16*      (2006.01)
*F16H 47/08*      (2006.01)
*B60K 1/00*      (2006.01)
*B60K 17/02*      (2006.01)
(52) U.S. Cl.
CPC ............... *F16H 47/08* (2013.01); *B60K 1/00* (2013.01); *B60K 2001/001* (2013.01); *B60K 17/02* (2013.01); *B60K 17/16* (2013.01)

(58) Field of Classification Search
CPC ........... F16H 47/08; B60K 1/00; B60K 17/02; B60K 17/16; B60K 2001/001
See application file for complete search history.

(56) References Cited

U.S. PATENT DOCUMENTS

| | | | |
|---|---|---|---|
| 11,535,094 B2 | 12/2022 | Kawahara | |
| 2017/0158041 A1* | 6/2017 | Ohnemus | ................... F16H 3/78 |
| 2020/0325972 A1 | 10/2020 | Matsuoka | |

FOREIGN PATENT DOCUMENTS

| | | | |
|---|---|---|---|
| DE | 102015215965 A1 | 2/2017 | |
| DE | 102018127701 A1 | 5/2019 | |
| DE | 102019103242 A1 * | 8/2020 | ............. B60K 17/04 |
| DE | 102019103711 A1 | 8/2020 | |

(Continued)

OTHER PUBLICATIONS

International Search Report (with English translation) and Written Opinion issued on Apr. 29, 2024, in corresponding International Application No. PCT/EP2024/050394; 30 pages.

(Continued)

*Primary Examiner* — Justin Holmes
(74) *Attorney, Agent, or Firm* — Maier & Maier, PLLC

(57) ABSTRACT

A drive device for a motor vehicle, having an electric traction machine, a torque converter, a transmission gearbox and a differential gearbox, the traction machine is propulsively connected to the differential gearbox—in the specified order—via the torque converter and the transmission gearbox. The traction machine is propulsively connected to the torque converter via a spur gear or gearless.

9 Claims, 3 Drawing Sheets

(56) References Cited

FOREIGN PATENT DOCUMENTS

| | | | |
|---|---|---|---|
| DE | 102019111811 A1 | 11/2020 | |
| DE | 102020114063 A1 | 12/2021 | |
| JP | 4697990 B2 * | 6/2011 | ....... F16H 61/66259 |
| JP | 2011231857 A | 11/2011 | |

OTHER PUBLICATIONS

International Preliminary Report on Patentability issued on Dec. 19, 2024, in corresponding International Application No. PCT/EP2024/050394; 89 pages.
International Preliminary Report on Patentability issued on Jul. 17, 2025, in corresponding International Application No. PCT/EP2024/050394, 13 pages.

* cited by examiner

DRIVE DEVICE FOR A MOTOR VEHICLE

FIELD

The invention relates to a drive device for a motor vehicle, with an electric traction machine, a torque converter, a transmission gearbox and a differential gearbox, wherein the traction machine is propulsively connected to the differential gearbox—in the specified order—via the torque converter and the transmission gearbox, the traction machine is propulsively connected to the torque converter via a spur gear or gearless, wherein the transmission gearbox is designed as a planetary gear transmission and comprises a sun gear, a ring gear and at least one planet gear rotatably mounted on a planet gear carrier and in engagement with the sun gear and the ring gear, wherein the sun gear is arranged on the drive side of the torque converter and the planetary gear carrier is arranged on the drive side of the differential gearbox and the ring gear is fixed.

BACKGROUND

Publication DE 10 2015 215 965 A1, for example, is known from the state of the art. This describes a drive device for a motor vehicle with at least one electric traction machine for driving the motor vehicle, and with a hydrodynamic torque converter which can be driven by the traction machine, wherein a gearbox is provided which can be driven by the traction machine and via which the torque converter can be driven.

The publication DE 10 2019 103 242 A1 relates to an electric drive device for a motor vehicle, comprising an electric drive machine with a rotor and a stator and a transmission device arranged coaxially thereto with a planetary gear and a differential gearbox, wherein the differential gearbox is operatively connected to a first and second output shaft, wherein a torque converter with a shaft bushing is effectively arranged between the drive machine and the transmission device, wherein one of the two output shafts is guided axially through the shaft bushing and the electric drive machine.

The prior art also includes publications U.S. Pat. No. 11,535,094 B2, DE 10 2019 103711 A1, JP 2011 231857 A, US 2020/325972 A1, DE 10 2018 127701 A1 and DE 10 2020 114063 A1.

SUMMARY

The objective of the invention is to propose a drive device for a motor vehicle which comprises advantages over known drive devices, in particular can be operated flexibly and can be realised with a small installation space.

According to the invention, this is achieved with a drive device for a motor vehicle. It is provided that the ring gear is fixed via a ring gear shaft arranged in axial direction with respect to the axis of rotation of the traction machine in overlap with the traction machine.

The drive device is used to drive the motor vehicle, that is, to provide a drive torque directed towards driving the motor vehicle. To provide the drive torque, the drive device comprises the electric traction machine, by means of which the drive torque is fully provided at least temporarily or continuously. The motor vehicle is preferably an electric motor vehicle or an electrically powered motor vehicle and preferably does not have an internal combustion engine.

In addition to the traction machine, the drive device comprises the hydrodynamic torque converter, the transmission gearbox and the differential gearbox. The hydrodynamic torque converter is arranged between the traction machine and the transmission gearbox, so that the transmission gearbox is propulsively connected to the traction machine via the torque converter. The differential gearbox, in turn, is connected to the torque converter via the transmission gearbox; accordingly, the transmission gearbox is located between the torque converter and the differential gearbox in terms of drive technology. Consequently, the traction machine is connected to the differential gearbox via the torque converter and the transmission gearbox in terms of drive technology, wherein the torque converter and the transmission gearbox are arranged in the specified order in terms of drive technology.

The transmission gearbox is a gearbox with which a transmission ratio other than one is generated. A rotational speed ratio other than one is always present between a transmission gearbox output shaft and a transmission gearbox input shaft of the transmission gearbox—at a rotational speed other than zero.

The differential gearbox is preferably an axle differential gearbox. This means that exactly one wheel axle of the motor vehicle is connected to the drive device via the differential gearbox. The wheel axle has several sub axles, which are coupled to each other via the differential gearbox and are each propulsively connected to the drive device. Alternatively, the differential gearbox can of course be a centre differential gearbox. In this case, several wheel axles are propulsively connected to the drive device or the traction machine via the differential gearbox. For example, each of the several wheel axles is connected to the differential gearbox of the drive device via an axle differential gearbox, so that there are several differential gearboxes in total.

In some cases, motor vehicles place high demands on the drive torque or require a very high drive torque. This is particularly the case with off-road motor vehicles. The traction machine could be designed accordingly and a corresponding nominal torque could be provided. However, this leads to a large traction machine and correspondingly to a high installation space requirement for the drive device. The same applies to the provision of several traction machines connected to one another in terms of drive technology, wherein the several traction machines are used to drive the same wheel axle of the motor vehicle. A shiftable gearbox or a gear change gearbox can also be provided in order to fulfil the requirements with regard to the high drive torque. In any case, however, this leads to a high complexity of the drive device and a large installation space requirement.

For this reason, the drive device has a torque converter. This is used to achieve a torque boost, at least temporarily, so that a drive torque is provided at the wheel axle of the motor vehicle that is greater than could be achieved at the current rotational speed of the wheel axle and without a torque converter coupled to the drive device. On the one hand, a very high drive torque is thus provided at least temporarily with the aid of the torque converter and, on the other hand, particularly sensitive driving is possible for a low driving speed of the motor vehicle. This is important, for example, when starting off off-road and when the motor vehicle drives over obstacles. In principle, the rotational speed of the wheel axle can be set more sensitively. In addition, an overload decoupling between the traction machine and the wheel axle is realised or at least feasible.

It is known, for example, to connect the traction machine to the torque converter via a planetary gearbox. However, this leads to a comparatively large installation space, especially as the traction machine must always be installed coaxially with such a planetary gearbox and there are no other options for the arrangement of the traction machine. For this reason, according to the invention, the traction machine should be connected to the torque converter via the spur gear or gearless. The spur gear is characterised by gearwheels on parallel shafts, meaning that the gearwheels comprise axes of rotation that are spaced parallel to each other. This distinguishes it from the planetary gearbox, in which a sun gear, a planetary gear carrier and a ring gear are arranged coaxially to each other.

Alternatively, the traction machine is connected to the torque converter gearless. This means that a drive shaft of the traction machine is coupled to an input shaft of the torque converter in such a way that they always comprise the same rotational speed. On the one hand, the described configuration of the drive device enables the aforementioned flexible operation and, on the other hand, is extremely compact in design and flexible in the arrangement of the traction machine.

The invention provides that the transmission gearbox is designed as a planetary gear transmission. In other words, the transmission gearbox is a planetary gearbox. The planetary gear transmission has a sun gear, a ring gear and a planetary gear carrier, wherein at least one planetary gear is rotatably borne on the latter. The at least one planetary gear is engaged with both the sun gear and the ring gear, that is, meshes with them. Preferably, of course, several planet gears are rotatably mounted on the planet gear carrier, wherein each of the planet gears meshes with both the sun gear and the ring gear. A particularly high transmission ratio can be achieved with the planetary gear transmission.

Alternatively and not according to the invention, the transmission gearbox is configured as a single-stage or multi-stage spur gear transmission. This means that it comprises two gearwheels in the first variant and at least three gearwheels in the second variant, wherein an input gearwheel is propulsively connected to an output gearwheel exclusively via at least one intermediate gearwheel. If there are several intermediate gears, these are connected in series for drive purposes. In a further configuration not according to the invention, the transmission gearbox is a wrap-around transmission in which the drive torque is transmitted using a traction means. Depending on the configuration of the transmission gearbox, either a flexible arrangement and a low space requirement of the drive device or a comparatively high transmission ratio are available.

An embodiment of the invention provides that the torque converter comprises a pump wheel driven by the traction machine, a turbine wheel driven by the differential gearbox and a guide wheel, wherein the guide wheel is arranged on a guide wheel shaft. Such a configuration of the torque converter is known in principle. The pump wheel is propulsively connected to the traction machine either via the spur gear or gearless. The turbine wheel, on the other hand, is coupled to the differential gearbox and is connected to the traction machine exclusively via the impeller.

The pump wheel is used to pump a fluid in the direction of the turbine wheel so that the latter is driven by the fluid. The pump wheel and the turbine wheel are fluidically or hydrodynamically connected to each other via the fluid. The guide wheel, which guides the fluid flow, is arranged between the pump wheel and the turbine wheel. The guide wheel is arranged on the guide wheel shaft, for example it is rigidly connected to it.

It may be provided that the guide wheel can be rotated in one direction of rotation by means of a freewheel, but is fixed in an opposite direction of rotation. The torque converter is designed accordingly as a Trilok converter. The freewheel is located, for example, between the guide wheel and the guide wheel shaft, wherein the guide wheel shaft is rigidly arranged. However, it may also be provided that the guide wheel is rigidly coupled to the guide wheel shaft and the guide wheel shaft is rotatably mounted in only one direction of rotation by means of the freewheel. Such a configuration of the torque converter enables a particularly pronounced torque boost.

An embodiment of the invention provides that the guide wheel shaft is received by an input shaft configured as a hollow shaft, or that the guide wheel shaft is configured as a hollow shaft and receives an output shaft between the torque converter and the transmission gearbox or a differential gearbox output shaft of the differential gearbox. In the former case, the guide wheel shaft is arranged coaxially to the input shaft; in the latter case, the guide wheel shaft is arranged coaxially to the output shaft or the differential gear output shaft. This enables a compact configuration of the drive device.

An embodiment of the invention provides that the traction machine is arranged coaxially or eccentrically to the output shaft. The coaxial arrangement of the traction machine is present in particular when the traction machine is connected to the torque converter gearless. The eccentric arrangement is achieved using the spur gear. Again, this serves to realise a particularly compact drive device.

An embodiment of the invention provides that a locking clutch is arranged between the traction machine and the torque converter or on a side of the torque converter facing away from the traction machine in the axial direction with respect to an axis of rotation of the traction machine. The axis of rotation of the traction machine is to be understood as the axis of rotation of an output shaft or machine shaft of the traction machine, which is connected to the torque converter via the spur gear or gearless. The described options for the arrangement of the locking clutch again ensure the space-saving configuration of the drive device.

An embodiment of the invention provides that the turbine wheel is arranged on the side of the pump wheel facing the traction machine, as viewed in the axial direction with respect to the axis of rotation of the traction machine, or that the pump wheel is arranged on the side of the turbine wheel facing the traction machine, as viewed in the axial direction with respect to the axis of rotation of the traction machine. The different arrangements of the turbine wheel or the pump wheel again serve to achieve a compact configuration of the drive device, so that the smallest possible installation space requirement is realised.

The invention provides that the planetary gear transmission comprises a sun gear, a ring gear and at least one planetary gear rotatably mounted on the planetary gear carrier and in engagement with the sun gear and the ring gear, wherein the sun gear is arranged on the drive side of the torque converter and the planetary gear carrier is arranged on the drive side of the differential gearbox and the ring gear is fixed. This means that the sun gear is propulsively connected to the torque converter and the planetary gear carrier is coupled to the torque converter exclusively via the sun gear. Conversely, the planetary gear carrier is connected to the differential gearbox and the sun gear is coupled to the differential gearbox exclusively via the planetary gear carrier. The ring gear is arranged in a fixed position, for example it is attached to a housing of the transmission gearbox or configured in one piece with it. This results in the compact configuration of the drive device.

The invention provides that the ring gear is fixed by means of a ring gear shaft arranged in axial direction with respect to the axis of rotation of the traction machine in overlap with the traction machine. The ring gear is fixed by means of the ring gear shaft, which is rigidly connected to the ring gear. Starting from the ring gear, the ring gear shaft extends in an axial direction in relation to the axis of rotation of the traction machine to such an extent that it overlaps with the traction machine or even completely engages over or through it. This ensures reliable fixing of the ring gear.

An embodiment of the invention provides that the ring gear shaft is arranged coaxially to the differential gear output shaft and/or the guide wheel shaft. The coaxial arrangement enables a particularly compact design of the drive device.

The features and combinations of features described in the description, in particular the features and combinations of features described in the following description of the figures and/or shown in the figures, can be used not only in the combination indicated in each case, but also in other combinations or on their own, insofar as this does not depart from the scope of the invention as defined by the claims. Thus, embodiments which are not explicitly shown or explained in the description and/or the figures, but which emerge from the explained embodiments or can be derived from them, are also to be regarded as encompassed by the invention, provided that these embodiments are within the scope of the claims

BRIEF DESCRIPTION OF THE FIGURES

The invention is explained below with reference to the initial examples shown in the drawings. It shows.

DETAILED DESCRIPTION

Figure 1:
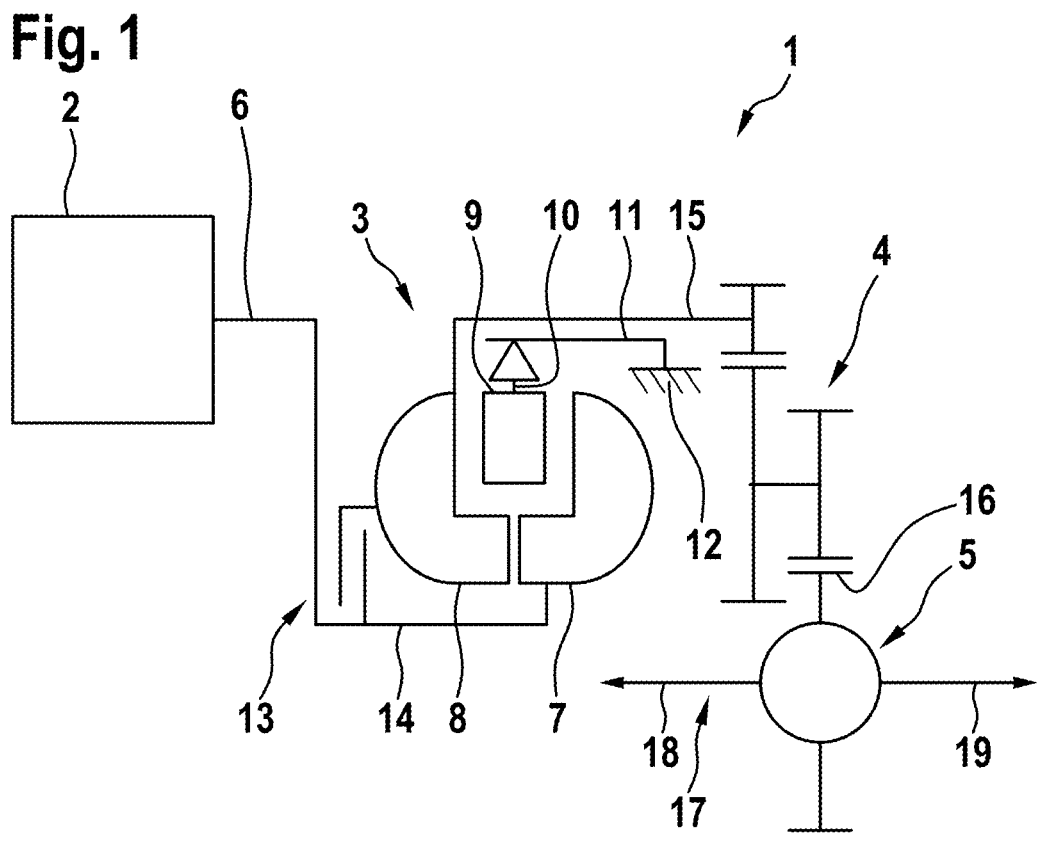
FIG. 1 is a schematic representation of a drive device for a motor vehicle in a first exemplary embodiment not falling within the wording of claim 1.

FIG. 1 shows a schematic representation of a drive device 1 for a motor vehicle in a first exemplary embodiment. The drive device 1 has an electric traction machine 2, a torque converter 3, a transmission gearbox 4 and a differential gearbox 5.

The traction machine 2 comprises a drive shaft 6, which is propulsively connected to the torque converter 3, in the exemplary embodiment shown here gearless, that is, not via a gearbox. The drive shaft 6 is coupled to a pump wheel 7, preferably rigid and permanent. In addition to the pump wheel 7, the torque converter 3 has a turbine wheel 8 and a guide wheel 9. The guide wheel 9 is arranged fluidically between the pump wheel 7 and the turbine wheel 8 and is rotatably mounted on a guide wheel shaft 11 via a freewheel

10. The guide wheel shaft 11 is fixed in position, for example on a housing 12 of the drive device 1, which is only indicated here.

Furthermore, the torque converter 3 has a locking clutch 13, by means of which the pump wheel 7 and the turbine wheel 8 can be mechanically coupled. In a first setting of the locking clutch 13, the pump wheel 7 and the turbine wheel 8 are therefore propulsively decoupled from each other, whereas in a second setting they are mechanically connected to each other, preferably rigidly or at least essentially rigidly, thus essentially without coupling slip. The drive shaft 6 is connected to the pump wheel 7 via an input shaft 14 of the torque converter 3.

The turbine wheel 8 is connected via an output shaft 15 to the transmission gearbox 4, which in the exemplary embodiment shown here is configured as a multi-stage spur gear transmission. The output shaft 15 is coupled to the differential gearbox 5 via the transmission gearbox 4, in particular to an input gear 16 of the differential gearbox 5. The transmission gearbox 4 is propulsively connected to a wheel axle 17 of the motor vehicle via the differential gearbox 5, which has two sub axles 18 and 19. The sub axles 18 and 19 can also be referred to as differential gear output shafts.

It can be seen that the guide wheel shaft 11 is configured as a hollow shaft and accommodates the output shaft 15. In addition, the traction machine 2 is arranged coaxially to the output shaft 15 due to the gearless connection to the torque converter 3. The locking clutch 13 is arranged in the axial direction with respect to the axis of rotation of the traction machine 2 or the drive shaft 6 between the traction machine 2 and the torque converter 3, i.e. on the side of the torque converter 3 facing away from the transmission gearbox 4. The turbine wheel 8 is located, again viewed in the axial direction, on the side of the pump wheel 7 facing the traction machine 2. Overall, a compact configuration of the drive device 1 is thus achieved. As an alternative to the configuration shown here, the transmission gearbox 4 can also be designed as a wrap-around transmission.

Figure 2:
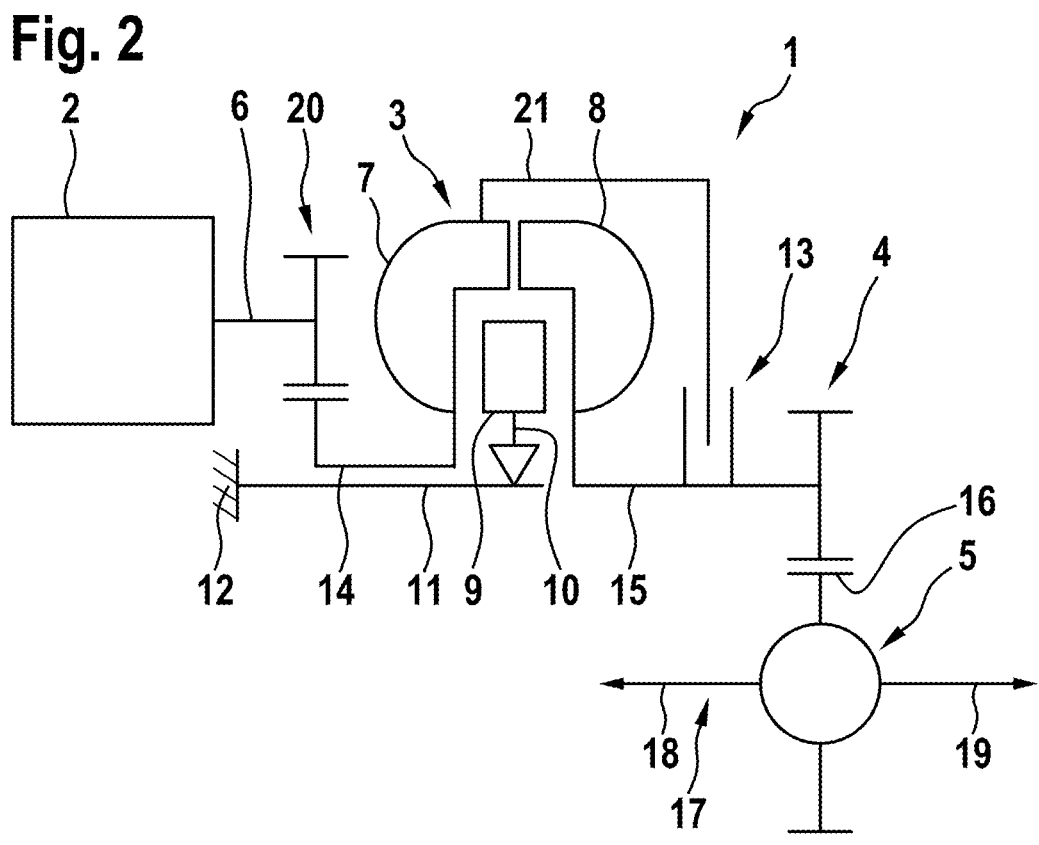
FIG. 2 is a schematic representation of the drive device in a second exemplary embodiment not falling within the wording of claim 1.

FIG. 2 shows a schematic representation of a second exemplary embodiment of the drive device 1. With regard to the designation of the individual elements and the basic configuration, reference is made to the explanations of the first exemplary embodiment and only the differences are discussed below. These differences lie in the fact that the traction machine 2 is connected to the torque converter 3 or the pump wheel 7 via a spur gear 20. This achieves an eccentric arrangement of the traction machine 2 in relation to the output shaft 15.

The input shaft 14 or the pump wheel 7 is connected to the locking clutch 13 via a coupling shaft 21. This coupling shaft 21 engages over the turbine wheel 8 in the axial direction, so that the pump wheel 7 on the one hand and the locking clutch 13 on the other hand are present on the turbine wheel 8 or accommodate it between them. The transmission gearbox 4 is a single-stage spur gear transmission. The guide wheel shaft 11 is arranged coaxially to the output shaft 15 and is received in some areas by the input shaft 14, which is configured as a hollow shaft. Starting from the guide wheel 9 or the freewheel 10, the guide wheel shaft 11 extends in an axial direction in the direction of the traction machine 2; in particular, it is connected to the housing 12 on the side of the spur gear 20 facing away from the guide wheel 9. The locking clutch 13 is arranged in the axial direction on the side of the torque converter 3 facing away from the traction machine 2. The turbine wheel 8 is located on the side of the pump wheel 7 facing away from the traction machine 2 when viewed in the axial direction.

As an alternative to the illustration shown, the traction machine 2 can also be arranged on the opposite side, so that the spur gear 20 is connected to the pump wheel 7 via the coupling shaft 21. Of course, the transmission gearbox 4 can also be a wrap-around transmission instead of the spur gear transmission.

Figure 3:
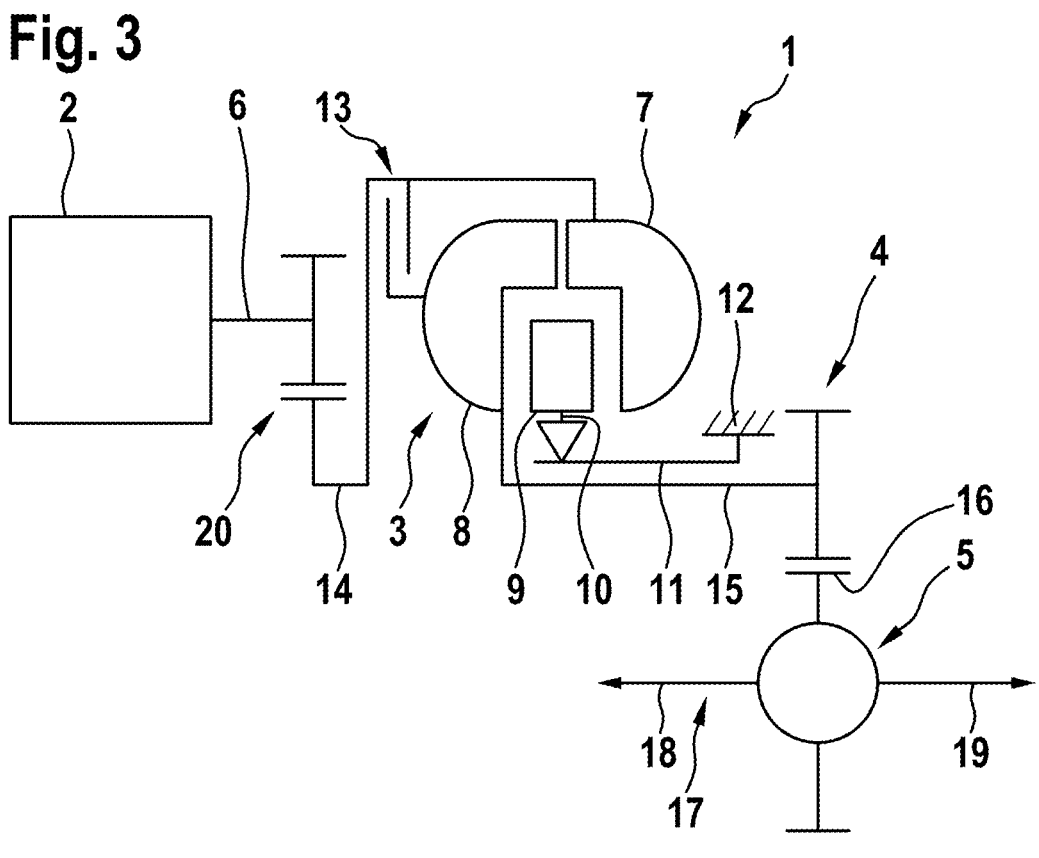
FIG. 3 is a schematic representation of a third exemplary embodiment of the drive device not falling within the wording of claim 1.

FIG. 3 shows a third exemplary embodiment of the drive device 1, again in schematic form. Once again, reference is made to the above explanations and only the differences are discussed. In the third exemplary embodiment, the traction machine 2 is connected to the torque converter 3 via the spur gear 20. The transmission gearbox 4 is also designed as a single-stage spur gear transmission. The difference to the second exemplary embodiment lies in particular in the mirrored arrangement of pump wheel 7 and turbine wheel 8 and the resulting arrangement of the guide wheel shaft 11, which is arranged coaxially to the output shaft 15 and configured as a hollow shaft receiving the output shaft 15. As an alternative to the exemplary embodiment shown, the traction machine 2 can be arranged on the other side of the torque converter 3, thus on the side of the pump wheel 7 opposite the turbine wheel 8. In addition, the transmission gearbox 4 can be designed as a wrap-around transmission instead of a spur gear transmission.

Figure 4:
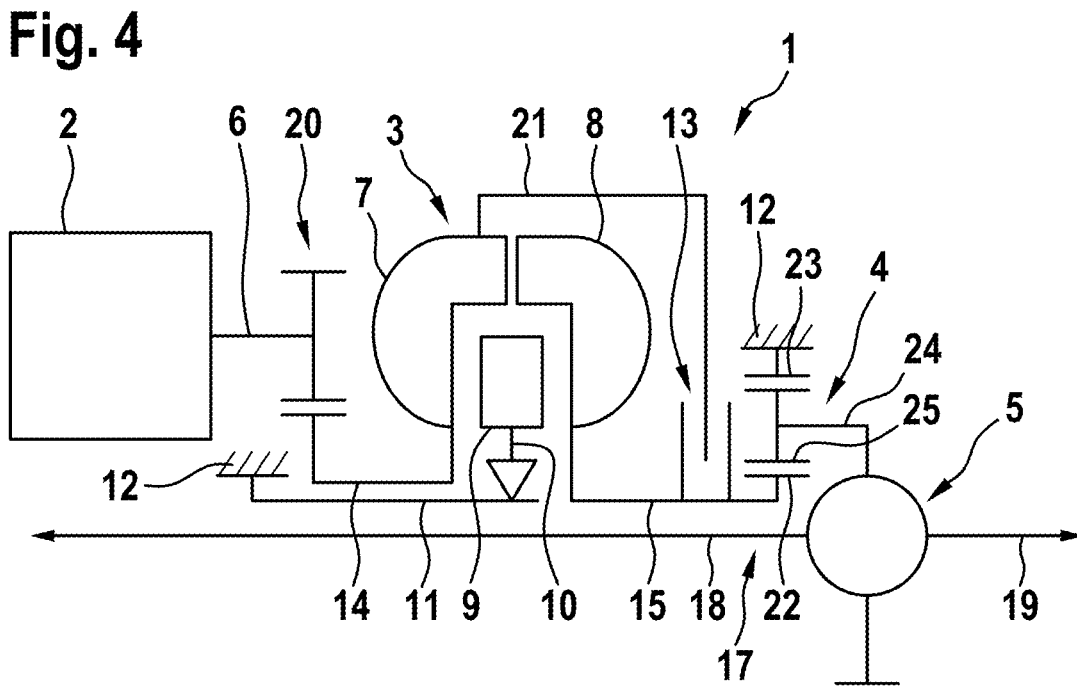
FIG. 4 is a schematic representation of the drive device of a fourth exemplary embodiment not falling within the wording of claim 1.

FIG. 4 shows a schematic representation of a fourth exemplary embodiment of the drive device 1. Reference is made to the above explanations, in particular to the second exemplary embodiment, and only the differences are discussed. These differences lie in the fact that the transmission gearbox 4 is not configured as a spur gear transmission, but as a planetary gear transmission. Accordingly, it has a sun gear 22, a ring gear 23 and a planetary gear carrier 24, on which a planetary gear 25 is rotatably mounted. The planetary gear 25 meshes with both the sun gear 22 and the ring gear 23. The planetary gear carrier 24 is connected to the differential gearbox 5; in particular, the planetary gear carrier 24 replaces the input gear 16. The ring gear 23 is arranged in a fixed position and is preferably connected to the housing 12 for this purpose.

The guide wheel shaft 11 is configured as a hollow shaft and accommodates one of the sub axles 18 and 19, in this case for example the sub axle 18. Accordingly, the input shaft 14 also embraces the sub-axle 18. The same applies to the output shaft 15, which is also a hollow shaft and embraces the sub-axle 18. In a modification of the configuration shown, the traction machine 2 can be arranged on the opposite side of the torque converter 3 and connected to the pump wheel 7 via the coupling shaft 21.

Figure 5:
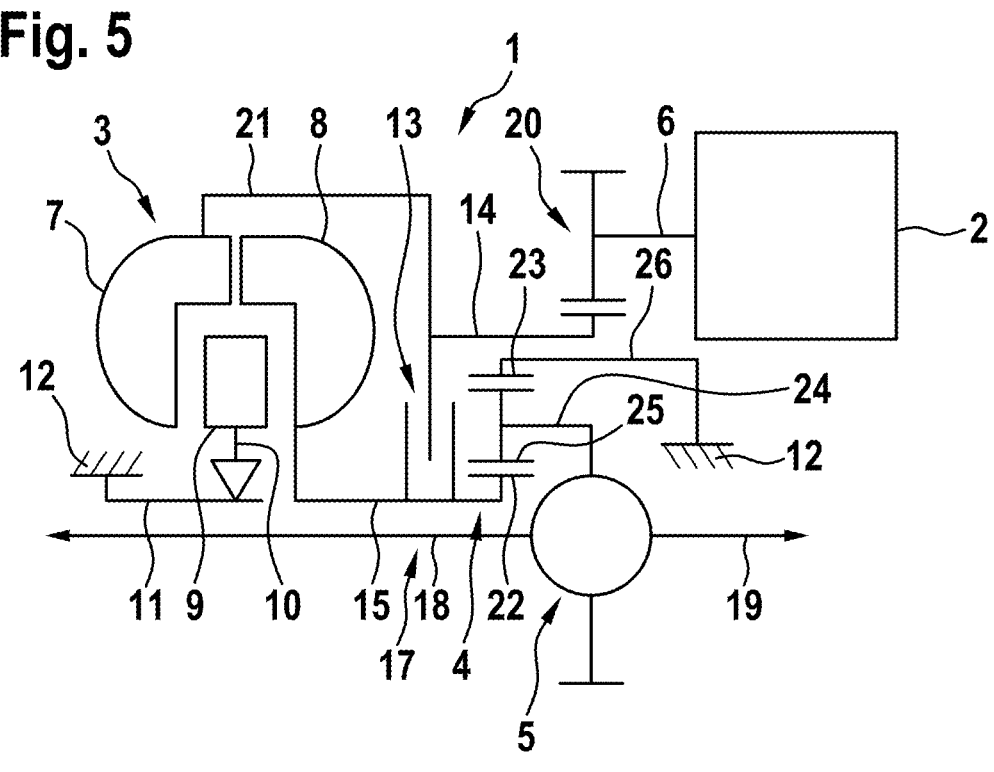
FIG. 5 is a schematic representation of the drive device in a fifth exemplary embodiment not falling within the wording of claim 1.

FIG. 5 shows a schematic representation of a fifth exemplary embodiment of the drive device 1. Reference is made to the above explanations, in particular to the explanations of the fourth exemplary embodiment, and only the differences are pointed out. These lie in the fact that the traction machine 2 is arranged on the side of the turbine wheel 8 facing away from the pump wheel 7 and is connected to the pump wheel 7 via the coupling shaft 21 overlapping the turbine wheel 8. The input shaft 14 is configured as a hollow shaft and engages around the transmission gearbox 4, which is again a planetary gear transmission gearbox.

For the fixed arrangement of the ring gear 23, it is necessary that a ring gear shaft 26 rigidly connected to the ring gear 23 extends out of the input shaft 14 and is arranged accordingly on the side of the spur gear 20 opposite the transmission gearbox 4. The ring gear shaft 26 is fastened to the housing 12 on its side facing away from the ring gear 23. As an alternative to the configuration described, the pump wheel 7 and the turbine wheel 8 can be interchanged with regard to their arrangement, so that the pump wheel 7 is arranged on the side of the turbine wheel 8 facing the traction machine 2.

Figure 6:
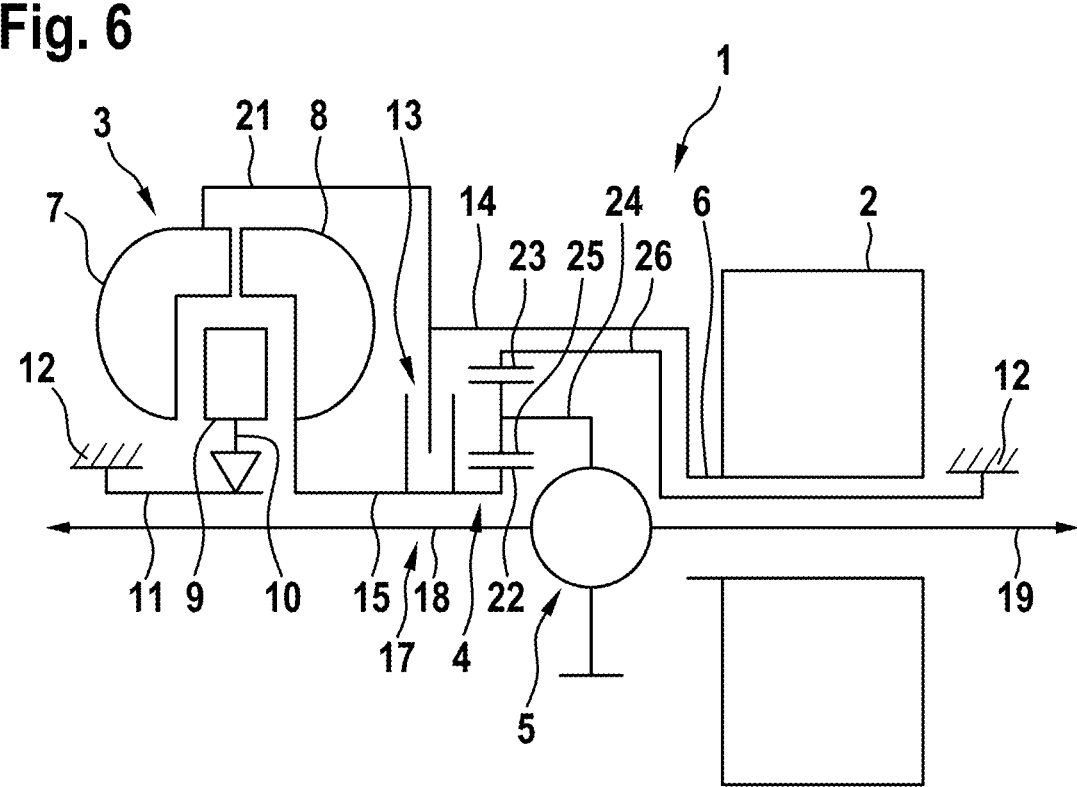
FIG. 6 is a schematic representation of an embodiment of the drive device falling within the wording of claim 1.

FIG. 6 shows a schematic representation of an embodiment of the drive device 1 according to the invention. Reference is made to the previous explanations, in particular to the fifth embodiment. Only the differences are pointed out below. These are that the spur gear 20 is omitted so that the traction machine 2 is connected to the torque converter 3 gearless. In this case, the traction machine 2 is arranged coaxially to the wheel axle 17, in particular the sub-axle 19, and surrounds it. This makes it necessary to extend the ring gear shaft 26 so that it passes through the traction machine 2 and is attached to the housing 12 on the side of the traction machine 2 facing away from the transmission gearbox 4.

Alternatively, the traction machine 2 can be arranged in the axial direction between the torque converter 3 and the differential gearbox 5. An arrangement of the traction machine 2 on the opposite side of the torque converter 3 can also be realised, so that the traction machine 2 is accordingly present on the side of the pump wheel 7 facing away from the turbine wheel 8. In addition, in a further configuration, a further transmission gearbox can be present in each of the sub axles 18 and 19, which is designed, for example, as a spur gear or as a planetary gear.

LIST OF REFERENCE SIGNS

1 Drive device
2 Traction machine
3 Torque converter
4 Transmission gearbox
5 Differential gearbox
6 Drive shaft
7 Pump wheel
8 Turbine wheel
9 Guide wheel
10 Freewheel
11 Guide wheel shaft
12 Housing
13 Locking clutch
14 Input shaft
15 Output shaft
16 Input wheel
17 Wheel axle
18 Sub axle
19 Sub axle
20 Spur gear
21 Coupling shaft
22 Sun gear
23 Ring gear
24 Planetary gear carrier
25 Planetary gear
26 Ring gear shaft

The invention claimed is:

1. A drive device for a motor vehicle, having an electric traction machine, a torque converter, a transmission gearbox and a differential gearbox, wherein the traction machine is propulsively connected to the differential gearbox via the torque converter and the transmission gearbox, in that order, wherein the traction machine is propulsively connected to the torque converter via a spur gear or gearless, wherein the transmission gearbox is designed as a planetary gear transmission and comprises a sun gear, a ring gear and at least one planet gear rotatably mounted on a planet gear carrier and in engagement with the sun gear and the ring gear, wherein the sun gear is arranged on an output side of the torque converter and the planet gear carrier is arranged on an input side of the differential gearbox, and the ring gear is fixed via a ring gear shaft arranged axially with respect to an axis of rotation of the traction machine and overlapping the traction machine in the axial direction, wherein the torque converter comprises a pump wheel driven by the traction machine, a turbine wheel driven by the differential gearbox, and a guide wheel, wherein the guide wheel is arranged on a guide wheel shaft, wherein the turbine wheel is connected via an output shaft to the transmission gearbox, and wherein the guide wheel shaft is configured as a hollow shaft and receives a differential gearbox output shaft of the differential gearbox.

2. The drive device according to claim 1, wherein the traction machine is arranged coaxially or eccentrically with respect to the output shaft.

3. The drive device according to claim 2, wherein a locking clutch is arranged between the traction machine and the torque converter or on a side of the torque converter facing away from the traction machine, as viewed in the axial direction with respect to an axis of rotation of the traction machine.

4. The drive device according to claim 1, wherein a locking clutch is arranged between the traction machine and the torque converter or on a side of the torque converter facing away from the traction machine, as viewed in the axial direction with respect to an axis of rotation of the traction machine.

5. The drive device according to claim 1, wherein the turbine wheel is arranged on the side of the pump wheel facing the traction machine, as viewed in the axial direction with respect to the axis of rotation of the traction machine, or wherein the pump wheel is arranged on the side of the turbine wheel facing the traction machine, as viewed in the axial direction with respect to the axis of rotation of the traction machine.

6. The drive device according to claim 1, wherein the ring gear shaft is arranged coaxially with the differential gearbox output shaft or the guide wheel shaft.

7. A drive device for a motor vehicle, having an electric traction machine, a torque converter, a transmission gearbox and a differential gearbox, wherein the traction machine is propulsively connected to the differential gearbox via the torque converter and the transmission gearbox, in that order, wherein the traction machine is propulsively connected to the torque converter via a spur gear or gearless, wherein the transmission gearbox is designed as a planetary gear transmission and comprises a sun gear, a ring gear and at least one planet gear rotatably mounted on a planet gear carrier and in engagement with the sun gear and the ring gear, wherein the sun gear is arranged on an output side of the torque converter and the planet gear carrier is arranged on an input side of the differential gearbox, and the ring gear is fixed via a ring gear shaft arranged axially with respect to an axis of rotation of the traction machine and overlapping the traction machine in the axial direction, wherein the torque converter comprises a pump wheel driven by the traction machine, a turbine wheel driven by the differential gearbox, and a guide wheel arranged on a guide wheel shaft, wherein the ring gear shaft is arranged coaxially with the guide wheel shaft, and wherein the guide wheel shaft is received by an input shaft of the torque converter configured as a hollow shaft.

8. The drive device according to claim 7, wherein a locking clutch is arranged between the traction machine and the torque converter or on a side of the torque converter facing away from the traction machine, as viewed in the axial direction with respect to an axis of rotation of the traction machine.

9. The drive device according to claim 7, wherein the turbine wheel is arranged on the side of the pump wheel facing the traction machine, as viewed in the axial direction with respect to the axis of rotation of the traction machine, or wherein the pump wheel is arranged on the side of the turbine wheel facing the traction machine, as viewed in the axial direction with respect to the axis of rotation of the traction machine.

* * * * *